United States Patent

Gouldson et al.

Patent Number: 5,814,252
Date of Patent: Sep. 29, 1998

[54] METHOD OF MOLDING COINJECTED PLASTIC GARMENT HANGERS

[75] Inventors: Stanley Gouldson, Northport; Roland Harmer, Centereach; Olaf Olk, Hauppauge, all of N.Y.

[73] Assignee: Spotless Plastics Pty. Ltd., Australia

[21] Appl. No.: 484,325

[22] Filed: Jun. 7, 1995

Related U.S. Application Data

[63] Continuation of Ser. No. 315,610, Sep. 30, 1994, Pat. No. 5,785,216, which is a continuation-in-part of Ser. No. 885,291, May 18, 1992, abandoned, which is a continuation-in-part of Ser. No. 776,779, Oct. 17, 1991, Pat. No. 5,252,025.

[51] Int. Cl.$^6$ .......................... B29C 33/02; B29C 45/14; B29C 45/78; B29C 45/33
[52] U.S. Cl. .................. 264/40.5; 264/40.1; 264/255; 264/266; 264/274; 264/328.7; 264/328.8
[58] Field of Search .................... 264/250, 255, 264/259, 275, 328.7, 328.8, 294, 328.16, 266, 274, 271.1, 40.1, 40.5; 425/129.1, 170

[56] References Cited

U.S. PATENT DOCUMENTS

| | | |
|---|---|---|
| 264,912 | 6/1882 | Bliss et al. . |
| 302,214 | 7/1884 | Wilson . |
| 305,484 | 1/1884 | Fildan . |
| 3,024,953 | 3/1962 | O'Keefe . |
| 3,200,444 | 8/1965 | Davis . |
| 3,577,596 | 5/1971 | Bullard et al. . |
| 3,949,914 | 4/1976 | Ostroll . |
| 3,996,329 | 12/1976 | Holland et al. . |
| 4,006,547 | 2/1977 | Samuels . |
| 4,045,899 | 9/1977 | Richardson . |
| 4,059,384 | 11/1977 | Holland et al. . |
| 4,115,940 | 9/1978 | Phillips . |
| 4,243,362 | 1/1981 | Rees et al. . |
| 4,322,902 | 4/1982 | Lenthall . |
| 4,335,068 | 6/1982 | Hemery . |
| 4,385,025 | 5/1983 | Salerno et al. . |

(List continued on next page.)

FOREIGN PATENT DOCUMENTS

| | | |
|---|---|---|
| A 57011/80 | 9/1980 | Australia . |
| A 32088/84 | 8/1983 | Australia . |
| A 42320/78 | 8/1983 | Australia . |
| 0 172 149 | 2/1986 | European Pat. Off. . |
| 0 412 670 | 2/1991 | European Pat. Off. . |
| 2 473 949 | 7/1981 | France . |
| 2 601 618 | 1/1988 | France . |
| 1 929 875 | 6/1971 | Germany . |
| 3 401 816 | 4/1993 | Germany . |
| 57-187228 | 11/1982 | Japan . |
| 518708 | 4/1970 | Switzerland . |
| 2 010 774 | 12/1978 | United Kingdom . |
| 2 209 737 | 5/1989 | United Kingdom . |
| 2 215 709 | 9/1989 | United Kingdom . |

OTHER PUBLICATIONS

A & E Product Groups, Inc. Hangers Catalog, Model 448 p. 10.

*Primary Examiner*—Angela Ortiz
*Attorney, Agent, or Firm*—Scully, Scott, Murphy & Presser

[57] ABSTRACT

A molded plastic garment hanger constituted from two materials which are fused and mechanically bonded to form a composite hanger. Also disclosed is a method and apparatus for the two-step or co-injection molding of plastic materials for the formation of the plastic garment hanger construction. The plastic garment hanger incorporates an insert consisting of a second plastic material adapted to have indicia, logo or non-slip means molded therein, and which insert may be fused to the hanger structure so as to form a mechanical bond with the first plastic material constituting the basic garment hanger.

21 Claims, 9 Drawing Sheets

U.S. PATENT DOCUMENTS

| | | |
|---|---|---|
| 4,416,602 | 11/1983 | Neumiester . |
| 4,450,639 | 5/1984 | Duester . |
| 4,567,633 | 2/1986 | Corkery ................................. 264/274 |
| 4,623,079 | 11/1986 | Tendrup et al. . |
| 4,629,102 | 12/1986 | Tendrup et al. . |
| 4,708,614 | 11/1987 | Schomblond . |
| 4,711,621 | 12/1987 | Schomblond . |
| 4,717,324 | 1/1988 | Schad et al. . |
| 4,724,111 | 2/1988 | Iwata et al. ............................ 264/266 |
| 4,726,758 | 2/1988 | Sekine et al. . |
| 4,768,649 | 9/1988 | Kolten et al. . |
| 4,800,641 | 1/1989 | Gelardi et al. . |
| 4,803,031 | 2/1989 | Ochs et al. . |
| 4,840,760 | 6/1989 | Oishi . |
| 4,885,121 | 12/1989 | Patel . |
| 4,886,195 | 12/1989 | Blanchard . |
| 4,892,237 | 1/1990 | Duester et al. . |
| 5,008,060 | 4/1991 | Kanai et al. ........................... 264/274 |
| 5,056,694 | 10/1991 | Michalik . |
| 5,078,307 | 1/1992 | Suddath . |
| 5,084,223 | 1/1992 | Morita . |
| 5,094,602 | 3/1992 | Morita . |
| 5,125,816 | 6/1992 | Morita . |
| 5,186,955 | 2/1993 | Morita et al. . |
| 5,192,481 | 3/1993 | Morita . |
| 5,464,578 | 11/1995 | Salter et al. ........................... 264/274 |

METHOD OF MOLDING COINJECTED PLASTIC GARMENT HANGERS

CROSS-REFERENCE TO RELATED APPLICATIONS

This is a continuation of application Ser. No. 08/315,610, filed on Sep. 30, 1994, U.S. Pat. No. 5,785,216, which is a continuation-in-part application of Ser. No. 07/885,291 filed May 18, 1992, now abandoned, which is a continuation-in-part of Ser. No. 07/776,779 filed Oct. 17, 1991, now U.S. Pat. No. 5,252,025.

FIELD OF INVENTION

The present invention relates to connected plastic garment hangers, and more particularly, pertains to a molded plastic garment hanger constituted from two materials which are co-injected to form a composite hanger. Moreover, the invention also relates to a novel method and apparatus for the two-step or co-injection molding of plastic materials for the formation of the plastic garment hanger construction.

BACKGROUND OF INVENTION

In industry, particularly such as the garment manufacturing industry, plastic garment hangers are widely employed for the purpose of shipping and displaying garments, such hangers frequently being of the inexpensive ship-on type whereby the garment is shipped from the manufacturer or wholesaler to the retailer while suspended from the hanger. Generally, such garment hangers are inexpensive single-piece or unitary molded plastic structures which are adapted to be either discarded at the time of sale, returned to the garment manufacturer or provided to a customer free of charge in conjunction with the purchase of the garment suspended therefrom.

Garment hangers of that type may either be simply constructed as molded plastic structures incorporating a unitary or metal central hook portion adapted to be suspended from a suitable support, such as a garment rack or the like, and with a hanger body portion having arms extending in opposite directions from the base of the hook portion so as to facilitate a garment to be suspended therefrom. When needed for a specific use, the opposite or distal ends of the body portion or arms may be formed with suitable grip slots or clip members to enable the attachment of various kinds of garments thereto, such as underwear, slips, brassieres, multiple garments, and the like.

The prior art includes a number of garment hangers that are molded so as to receive various indicia or logos, which may be representative of the garment manufacturer or designer, or possibly the retail establishment, to provide a form of advertisement and to also identify the origin of the garment being suspended therefrom. An embossed logo may also be imprinted therein so as to provide various color contrasts provided through molded raised or recessed surfaces representative of a logo, advertisement, or the like as mentioned hereinbefore.

The prior art also includes garment hangers for coats, blazers and other heavier garments which are fitted with pads or rubber strips, along the shoulder portion, or non-slip adhesive coatings on the pants bar to help retain the garment on the hanger.

U.S. Pat. No. 4,886,195 to Blanchard discloses a plastic garment hanger of a basically unitary construction wherein a garment size identification structure is molded into the hanger, such as in the shape of a flat surface molded into the hook portion of the hanger. Although this provides for a suitable provision of indicia, such as garment size identification or a logo and the like, the hanger would not be readily employable for garments produced by either different manufacturers or for garments of different sizes. Consequently, the garment hanger is limited to its use for a specific application and/or garment type or size.

U.S. Pat. No. 4,006,547 to Samuels et al. discloses a garment hanger in which indicia means are attachable to the hanger body in the form of tabs or the like which can be removed from the hanger at the point of sale, or replaced by other indicia-incorporating structure when it is required to employ the garment hanger for different garment types.

Similarly, U.S. Pat. No. 4,115,940 to Phillip discloses a molded plastic garment hanger in which clips or tabs bearing specified indicia may be detachably fastened to the hanger structure.

U.S. Pat. No. 4,655,867 to Berkovits discloses a garment hanger having a non-slip strip of resilient material adhesively secured to the shoulder portions of the hanger.

U.S. Pat. No. 4,606,482 to McHugh discloses a rod-type garment hanger having a pre-formed sleeve of non-slip protective material which is slipped over the rod portions of the hanger to assist in retaining garments on the hanger.

U.S. Pat. No. 4,058,241 to Craig discloses a tightly braided cover which is plaited around the periphery of a garment hanger to provide protection for the garment and to prevent garment slippage from the hanger.

U.S. Pat. No. 5,020,705 to Garrison discloses a garment clamping hanger which has garment gripping pads molded of a synthetic rubber which has a high coefficient of friction when firmly pressed against fabric and avoids marking or adhering to the fabric of a garment.

The prior art also discloses numerous kinds of apparatus and methods for molding two-component plastic materials; in essence, by means of a two-step or co-injection process. However, these have not been specifically applied to the production of a two-component or composite plastic garment hanger of the types considered herein.

In essence, U.S. Pat. No. 4,416,602 to Neumeister discloses an injection molding apparatus for manufacturing articles from different types of plastic materials, in which a first plastic material is injected into a mold to form a frame member or the like, and thereafter subsequent to cooling and solidifying of the molten plastic material, a second plastic material is injected into the cavity of the mold so as to form an insert within an aperture of the frame member provided by the first plastic material, thereby fusing the plastic materials and forming a mechanical bond therebetween.

In U.S. Pat. No. 5,020,705 to Garrison the garment gripping pads of the hanger clips are molded substantially simultaneously with the hanger so as to chemically bond with the material of the hanger. The hanger is molded with the front and rear jaws of the clip in the open position. When the mold is closed each cavity in which a pad is to be formed is occupied by a cam. While the cams are occupying the cavities for the pads, the hanger forming resin is injected into the mold to fill the entire mold except the spaces occupied by the cams. After the resin has sufficiently set, the cams occupying the pad forming cavities are withdrawn (upwardly) and the resin to form the pads is injected through opening 27. To avoid resin migration the opening is very small and a tab gate 47 is provided between the parting line and the opening such that when the hanger is ejected from the mold the resin is sheared by the tab gate from the resin remaining in the conduit.

Similar types of molding apparatus and methods of that kind are disclosed in various patent publications, representative of which are U.S. Pat. No. 4,711,621 to Schomblond disclosing a mold for producing composite bodies from different plastic materials; U.S. Pat. No. 4,335,068 to Hemery and U.S. Pat. No. 3,577,596 to Bullard et al.

SUMMARY OF THE INVENTION

The present invention relates to coinjected plastic hangers, a method of coinjection of the hangers and the apparatus for implementing the co-injection molding. Various desirable attributes for hangers may be created in a coinjected hanger which are not available to a hanger molded from a single plastic. These attributes may include color ornamentation, size index markings, logos or trademarks associated with the garment suspended from the garment, integrally molded non-slip portions to retain garments on the hangers, and garment retaining clips formed of resilient plastic to prevent breakage thereof.

Accordingly, in order to improve upon the plastic hangers which are currently available in the industry, and which incorporate integral structure bearing indicia or logos for the purpose of identifying manufacturers, designers, retailers or the like by having such information molded or embossed into the primary hanger construction, the invention contemplates the provision of molded plastic garment hangers incorporating at least at one suitable location on the hanger, a frame-like enclosure, with a through-aperture of predetermined size and configuration integrally molded with the basic hanger structure, and wherein an insert from a second or separate plastic material is adapted to be molded into the aperture of the enclosure and having the specified indicia, such as a logo or other suitable legends molded therein. The composite garment hangers which are thus formed from two separate materials, may be constituted from two plastic materials of the same color and/or type of plastic, or from different kinds of plastic materials and which, if desired, may be imparted different colors to provide a decorative effect. The second plastic material for the insert which is molded into the frame-like enclosure and which has the logo impressed or molded therein, is generally produced in the same mold for producing the basic hanger structure through a co-injection method, subsequently to the initial molding and cooling of the basic hanger structure so as to cause the insert to fuse and bond with the contacting surfaces within the enclosure molded into the plastic material for the hanger. This bond may be a mechanical bond, a plastic molded bond, a fusion bond or a combination thereof, depending on the plastics selected, and the relative injection, set and cool cycles of the coinjection machine. This imparts a versatility to the construction and utilization of such garment hangers inasmuch as a single mold with a movable core can be employed for forming the entire composite plastic garment hanger construction, and the mold may be modified with regard to the formation of the insert portion adapted to be received within the enclosure, so as to enable the hanger to be individualized concerning the incorporation of indicia representative manufacturers, designers and/or retail establishments at a minimum cost and effort.

For this purpose, the invention also contemplates a two-step molding procedure or, in essence, a co-injection plastic molding method whereby plastic materials of different types and/or colors may be readily employed so as to have a first plastic material of a specified type and color form the basic hanger structure, cooled to some extent within the mold so as to at least partially solidify, and thereafter a mold core is movable into a position in communication with an inlet for a further or second plastic material which may be either of the same color and/or type as the first plastic material or, possibly of a different color and/or material type, and in which the second plastic material forms the insert which is fused and bonded with the plastic material of the basic hanger structure so as to provide for either a permanent or detachable connection therebetween.

However, it may also be readily appreciated that, upon the manufacture of larger quantities of such garment hangers, in the event that appreciable numbers of such hangers bearing a specific indicia or logo cannot be employed, it may be possible to simply punch or knock out the insert by applying lateral mechanical pressure thereto, and thus facilitate removal of the undesired logo-bearing insert from the hanger without inherently damaging the basic hanger construction itself, thereby enabling such garment hangers to be generically employed with other types and makes of garments.

The present invention also provides a coinjected garment hanger having a non-slip plastic material that is molded and bonded to the shoulder portions of the hanger to prevent slippage of the garment from the hanger.

Accordingly, it is an object of the present invention to provide a molded plastic garment hanger which incorporates an insert consisting of a second plastic material adapted to have indicia, logo or non-slip means molded therein, and which insert may be fused to the hanger structure so as to form a molded plastic or mechanical bond with the first plastic material constituting the basic garment hanger.

Another object of the present invention is to provide a molded plastic garment hanger which incorporates a non-slip insert consisting of a second plastic material that is softer and stickier than the garment hanger body, which insert may be fused to the hanger structure so as to form a molded plastic or mechanical bond with the first plastic material constituting the basic garment hanger.

Still another object of the present invention is to provide a molded plastic hanger having a non-slip insert whereby the plastic material of the hanger and the plastic material of the insert utilize in combination mechanical interlock bonding and controlled thermal deformation to maximize the bonding effect of the two plastic materials.

Another object of the present invention is to provide a two-component plastic garment hanger adapted to be molded through a single co-injection molding process, whereby an insert which may be of a similar color and/or plastic material, as the basic hanger construction, or alternatively, of a different coloring and/or type of plastic material, is fused within a mold to the material of the basic hanger construction so as to form a mechanical bond therebetween.

Another object of the present invention is to provide a mold for the co-injection of at least two plastic materials to form a composite molded plastic garment hanger structure.

A more specific object resides in the provision of a plastic mold of the type described herein, in which a second plastic material is molded into a frame-like enclosure formed from the first plastic material producing the basic hanger construction so as to be fused thereto and forming a mechanical bond therewith.

Yet another object of the present invention is to provide a method for the co-injection molding of a plastic garment hanger construction which is constituted from composite plastic materials.

BRIEF DESCRIPTION OF THE DRAWINGS

The foregoing and other objects of the invention may now be more readily ascertained from the following detailed description of preferred embodiments thereof, taken in conjunction with the accompanying drawings; in which.

DETAILED DESCRIPTION OF THE INVENTION

Figure 1:
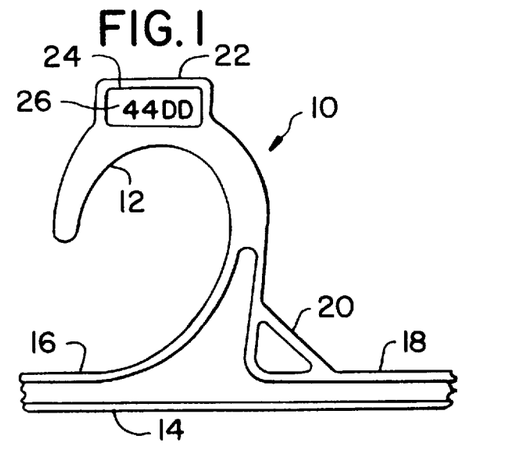
FIG. 1 illustrates a fragmentary side view of a molded plastic garment hanger incorporating an insert pursuant to the inventive concept.

Referring now in detail to the drawings, and particularly the hanger construction as shown in FIG. 1, there is illustrated a partial or fragmentary side view of a molded plastic garment hanger 10 having a central hook portion 12 which is integrally molded with hanger body 14, the latter of which includes a pair of coplanar oppositely directed arms 16 and 18 for suspending one or more garments, as is well known in industry. The distal ends of each of the arms 16 and 18 may, if desired, be equipped with suitable garment gripping or clip structures, for example, as disclosed in U.S. Pat. No. 4,623,079 to Tendrup et al., or alternatively, may be of a simple rounded end configuration to merely permit hanging suspension of a garment rather than fastening the garment to the hanger. In order to provide a reinforcement for the hook portion 12, a suitable gusset or flange 20 may be molded into the hanger proximate the juncture between base of the hook portion 12 and the arm 18 of the hanger body 14. This will impart an enhanced degree of strength against bending of the hook portion in the plane of the body 14 under the weight of a supported garment.

Pursuant to the inventive structure of the hanger, as shown in the embodiment of FIG. 1, the upper end of the hook portion 12 has integrally molded thereto a suitable enclosure or frame portion 22 providing an enclosed aperture 24, in this instance, of a generally rectangular configuration. Positioned within the aperture 24 of enclosure 22 is an insert 26 of a plastic material which may either be of the same color and/or type of plastic as that of the basic hanger construction or, alternatively, may be of a different plastic material and/or color to provide a composite hanger structure of a specific decorative nature. The plastic insert 26 is essentially molded into the enclosure 22 so as to fuse with the material of the contacting edge surface of the latter and to thereby form a plastic molded or mechanical bond between the insert 26 and the basic hanger structure 10 as will be hereinafter described in greater detail. Suitable logos and other kinds of indicia may be molded or sized into the insert 26, such as for identifying the garment manufacturer or designer, or the retailer, or may include any other suitable advertising or identifying legends in conformance with the requirements of the retailer or manufacturer of the garments.

Figure 2:
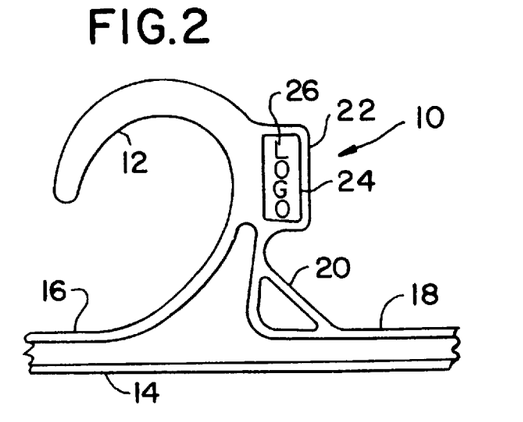
FIG. 2 illustrates an embodiment in a view similar to FIG. 1, showing a modification thereof.
Figure 3:
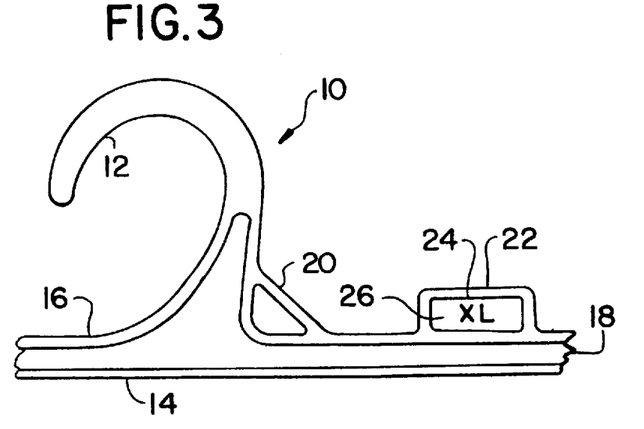
FIG. 3 illustrates an embodiment in a view similar to FIG. 1, showing a further modification thereof.
Figure 4:
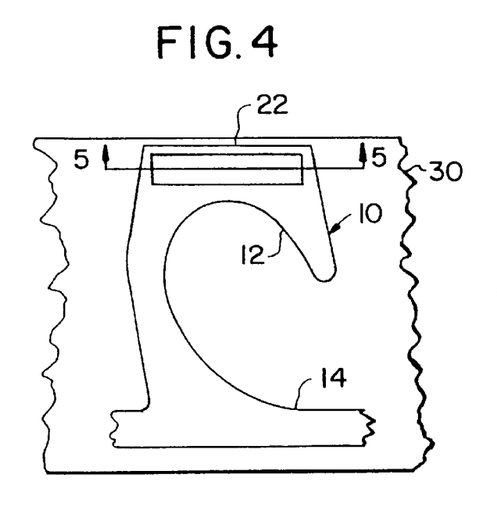
FIG. 4 illustrates a fragmentary schematic plan view of a mold showing the cavity for forming the plastic garment hanger pursuant to the invention.
Figure 5:
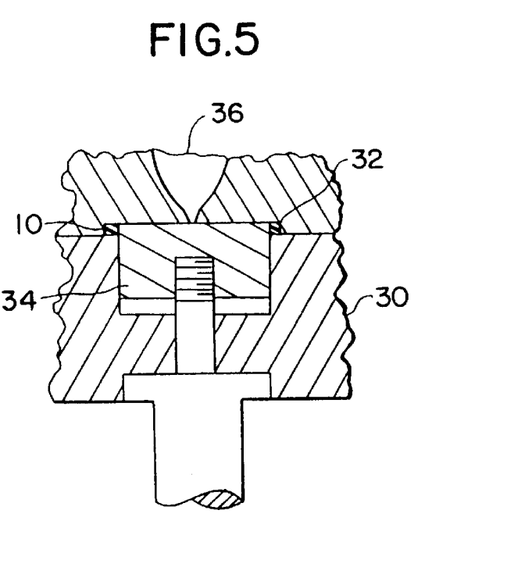
FIG. 5 illustrates a sectional view taken along line 5—5 in FIG. 4.

The modified embodiments of the hanger as shown in FIGS. 2 and 3, in which identical or similar elements are identified by the same reference numerals as those in FIG. 1, primarily differ from the former in the location of the enclosure 22 for the insert which is molded into the basic garment hanger construction, and whereby the insert 26 is shown at different positions relative to the hanger hook portion 12 and hanger body 14.

Thus, in FIG. 2, rather than being located at the upper end of the hook portion 12, the enclosure 22, and resultingly insert 26, are formed towards one side of the hook portion and extend coplanarly intermediate the upper end and the juncture of the base of the hook portion 12 with the hanger body 14.

Similarly, in the embodiment of FIG. 3, rather than being formed on the hook portion 12, the enclosure 22 may be molded onto the hanger body 14, in this instance, onto the arm 18 so as to extend upwardly therefrom in a type of tab structure, and with the insert 26 being fused and mechanically bonded therein as in the previous embodiments.

It is also possible to contemplate providing apertures for receiving inserts 26 in the body of the hanger portion 14 itself; for instance, such as in the region within the base of the hook portion, or at any other suitable location as desired by the needs of a customer for the garment hanger.

The entire composite hanger structure may be molded in a co-injection plastic mold 30, as shown diagrammatically in FIGS. 4 through 7 of the drawings.

Figure 6:
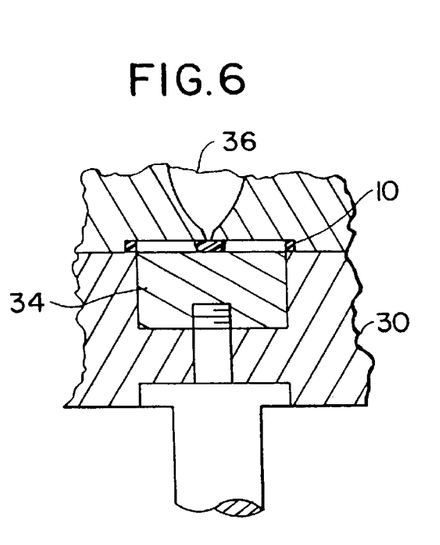
FIG. 6 illustrates a view similar to FIG. 5 showing the mold in a further operative position.
Figure 7:
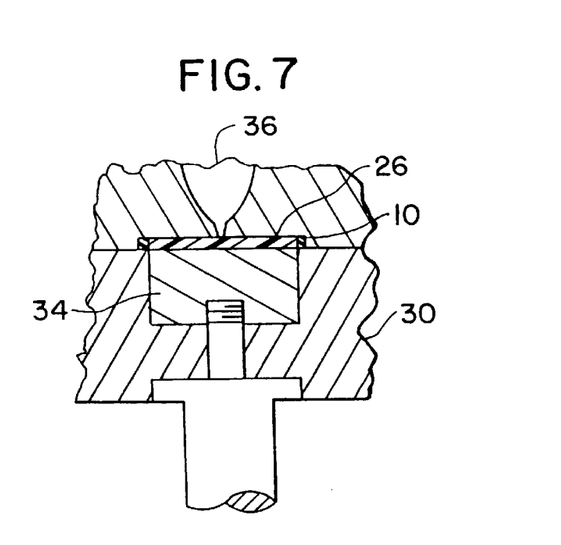
FIG. 7 illustrates a view similar to FIG. 5 showing the mold in the final operative position for forming the composite molded plastic garment hanger.

Hereby, the injection mold 30 includes a mold cavity 32 which is equipped with a movable core 34 to enable a first plastic material in a molten state to be injected therein so as to form the basic hanger construction 10 incorporating the enclosure or frame 22 for an insert 26 which is to be subsequently located therein. After this molding procedure is completed with regard to the injection of the first plastic material into the mold cavity 32 for the basic hanger construction 10, the core 34 is displaced, as shown in FIG. 6, so as to be retracted to close off the infeed for the first plastic material, and a second plastic material is commenced being injected into the mold cavity from a separate injection inlet 36. The second plastic material, as shown in FIG. 7 fills the aperture or pocket formed within the frame 22 when the core is fully retracted and the mold is allowed to cool to produce the insert 26. Hereby, the second mold cavity formed between the core 34 and the hanger 10 may also be provided with a suitable configuration to permit the concurrent molding of various logo or indicia into or onto the insert 26. The face of the core 34, and the opposing side of the mold cavity, formed by mold 30 may be embossed with complementary indicia, such as size indicia, which may be viewed from either side of the completed hanger. Upon opening of the mold subsequent to cooling, the completed composite garment hanger structure is ejected, the mold then closed and readied for the molding of another garment hanger pursuant to the invention.

Figure 8:
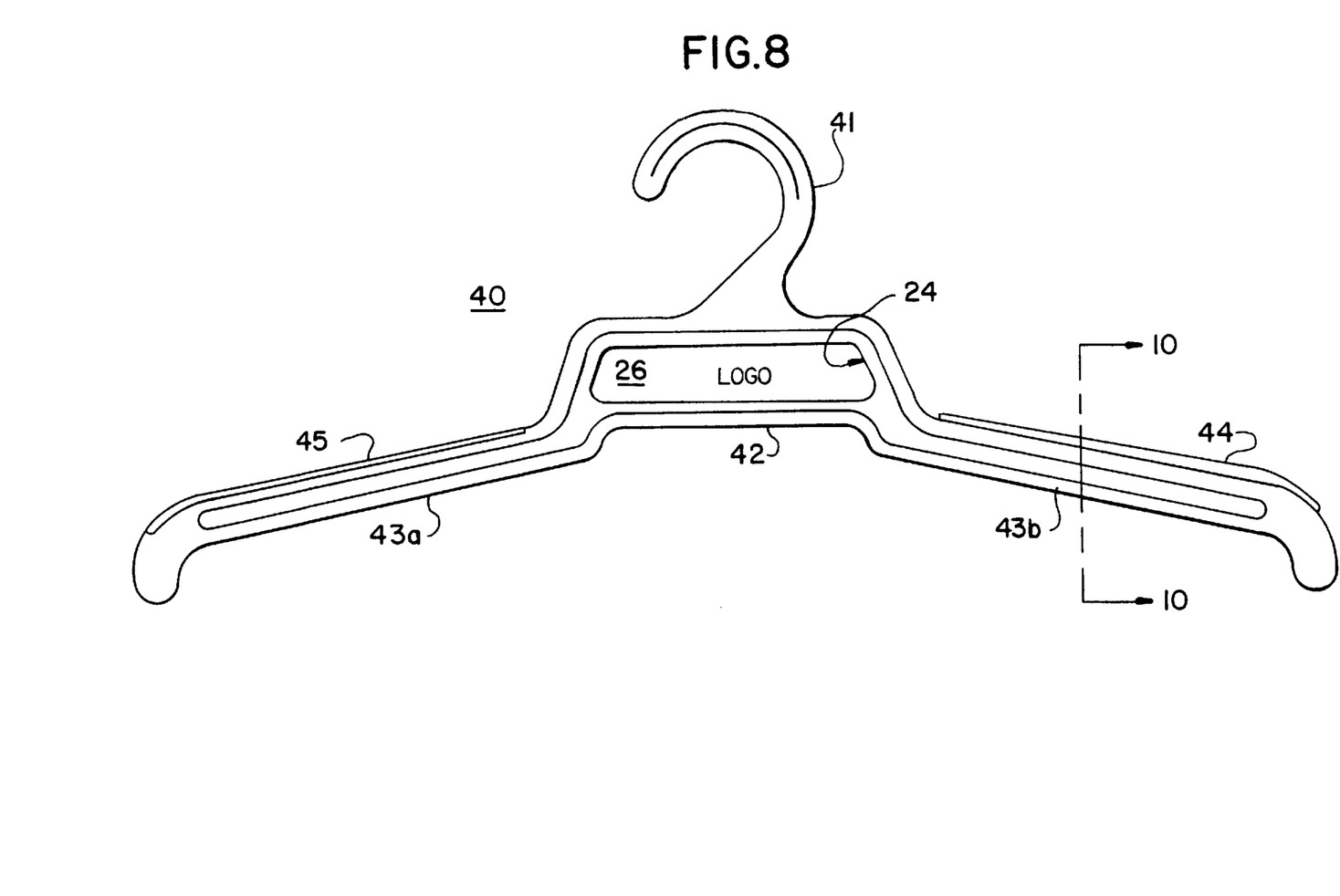
FIG. 8 illustrates a side view of an integral molded plastic garment hanger incorporating, for the purposes of illustration, two types of non-slip plastic inserts, with one type on each shoulder of the hanger.

FIG. 8 illustrates a side view of an integral molded plastic garment hanger 40 incorporating, for the purposes of illustration, two types of non-slip plastic inserts 44, 45, with one type of each insert on each shoulder of the hanger. The hanger illustrated in FIG. 8 includes a centrally located hook portion 41 and a molded body member 42 connected thereto which extends outwardly and downwardly from the lower end of the hook member. This hanger may also form an aperture 24 within body member 42 for receipt of an insert 26 in a manner similar to that illustrated for FIGS. 1–4. The molded body member has M section arms 43a, 43b which are illustrated in cross-section in FIG. 10 which provide structural strength for the hanger and support for the garment. For the purposes of illustration, two types of inserts 44, 45 are illustrated, although it is understood that in actual practice, each of the arms 43a, 43b would normally be equipped with the same type of insert. A cross-section of the arm 43b taken along section line 10—10 is illustrated in FIG. 10 which illustrates, in cross-section, the cross-section of the non-slip insert 44 bonded to the shoulder portion of hanger arm 43b. As illustrated in FIG. 8, the insert 44 sits on top of the shoulder to provide a non-slip gripping surface for hanger 40. A cross-section of arm 43a would be similar to the cross-section illustrated for FIG. 9, wherein the non-slip portion is completely embedded within the outwardly extending arm.

Figure 9:
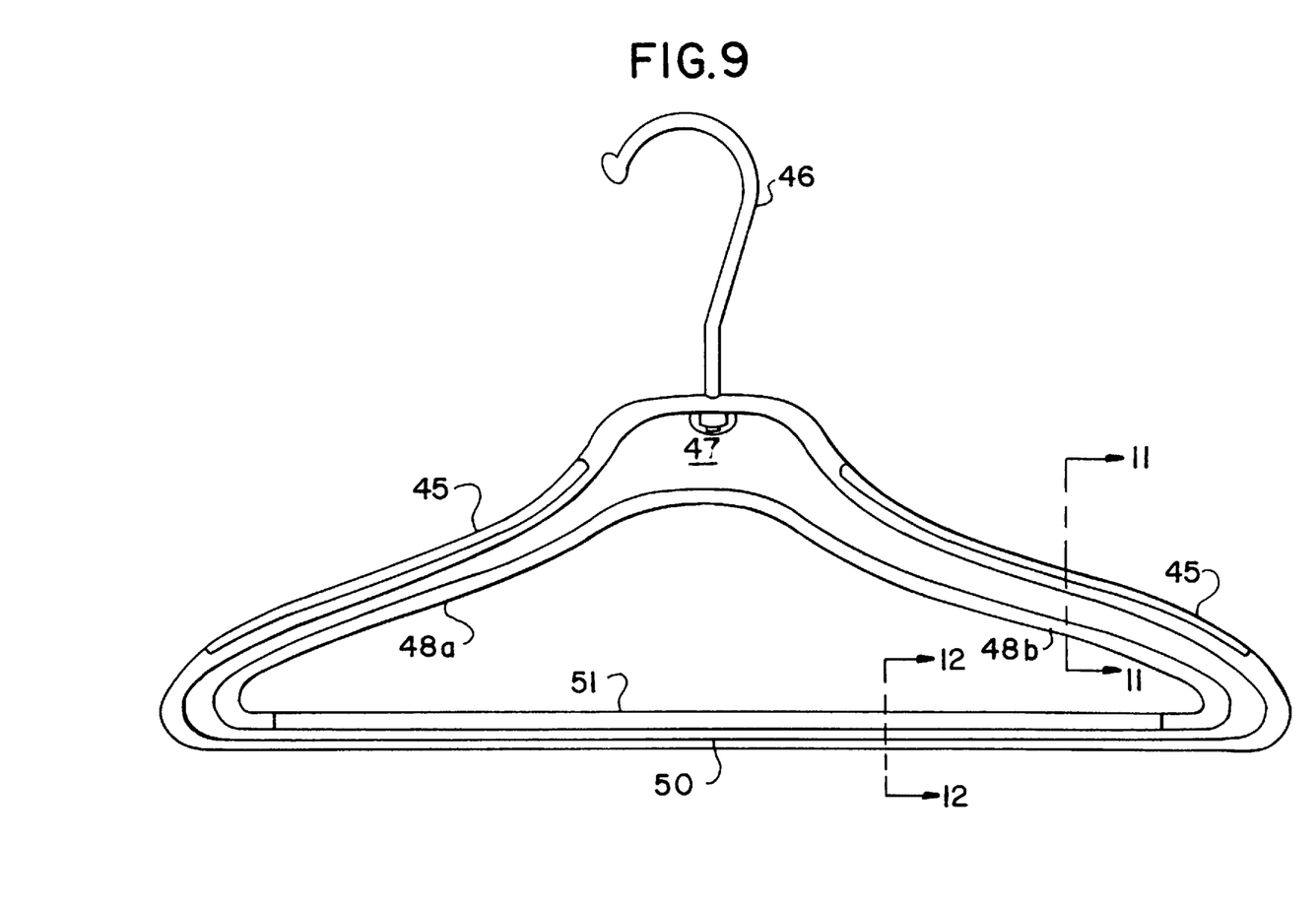
FIG. 9 illustrates a side view of a composite garment hanger having a molded plastic body incorporating non-slip plastic inserts in the shoulder portion thereof.
Figure 10:
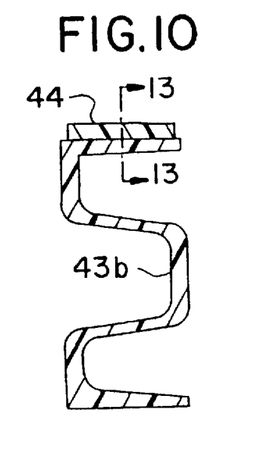
FIG. 10 is a cross-section of the hanger illustrated in FIG. 8 taken along section line 10—10.

FIG. 9 illustrates a composite hanger having a molded plastic body portion and a centrally located metal hook 46 arranged to suspend the hanger from a hanger support bar or the like. The molded plastic body 47 extends outwardly and downwardly from the lower end of the hook member with outwardly extending arms 48a, 48b. Each of the arms 48a, 48b has integrally molded therewith a non-slip layer 45 which forms the upper top portion of the shoulder of each of the hanger arms 48a, 48b.

Figure 11:
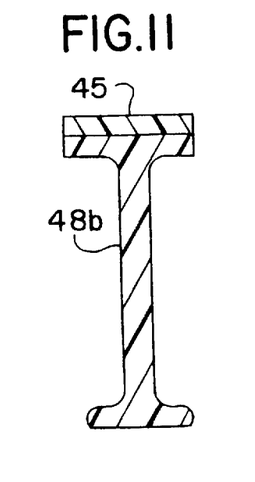
FIG. 11 is a cross-section of the hanger illustrated in FIG. 9 taken along section line 11—11.
Figure 12:
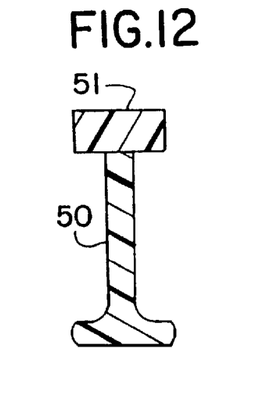
FIG. 12 is a cross-section of the lower portion of the hanger illustrated in FIG. 9 taken along section line 12—12.

FIG. 11 illustrates a cross-section of the hanger illustrated in FIG. 9 taken along section line 11—11. The hanger illustrated in FIG. 9 is a coat hanger suitable for supporting medium weight coats and blazers from arms 48a and 48b, and trousers from the trouser bar 50. Trouser bar 50 has fused thereto a non-slip insert 51 arranged across the entire upper portion of the pants support bar 50. A cross-section of the trouser bar 50 taken along the section line 12—12 is illustrated in FIG. 12.

The bond between the plastic insert 26 and the enclosure 22 of FIGS. 1–4 and the non-slip inserts 44, 45 and 51 and the hangers illustrated in FIGS. 8 and 9 may be a mechanical bond, a molded plastic bond, a fused bond or a combination thereof as desired. The factors which determine the type of bond include the chemical compatibility of the plastics involved, the melting and fusing temperatures of the respective plastics involved, the temperatures at which the plastic is injected into the respective mold cavities, the temperature at which the cavity is maintained, and the respective dwell time between the injection of the first plastic, and the removal of the mold insert and the injection of the second plastic.

By adjusting the parameters of the process, one may achieve a mechanical bond, a plastic molded bond, or a wholly fused bond wherein the surface layers of the plastics have intermixed with each other. In still another embodiment, distortion of the hanger mechanical interlocks as the second hot melt of plastic material flows into the insert produces a bond which is the combination of mechanical interlocking and controlled thermal deformation. This combination form of bonding is particularly advantageous for products, including but not limited to hangers having shoulder inserts, which will be subject to tensile and shear forces as well as compressive forces to ensure superior integrity between the two plastic materials being bonded, particularly in instances with materials having lower levels of chemical synergy.

Figure 13:
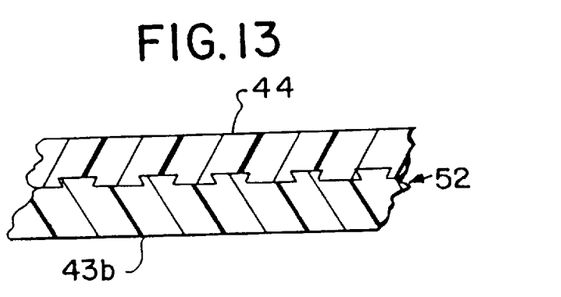
FIG. 13 is a cross-section of a portion of a garment hanger that would be formed by the mold illustrated in FIG. 16, taken along section line 13—13 in FIG. 16.
Figure 14:
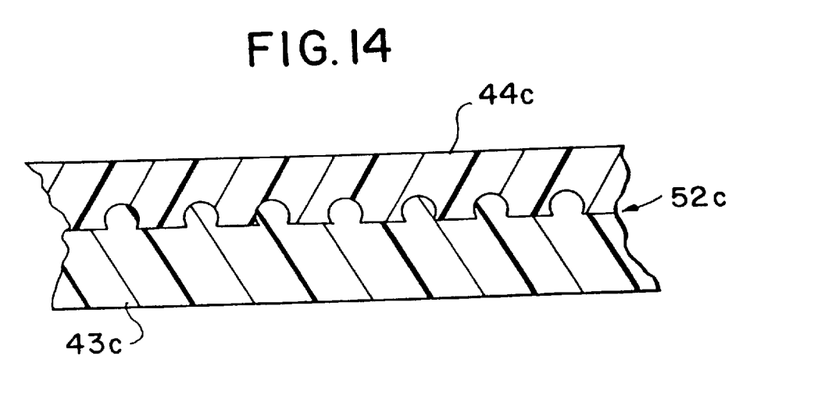
FIG. 14 is a cross-section of an alternative embodiment of the portion of a garment hanger that would be formed by an alternate mold construction, if taken along section line 13—13 in FIG. 16.
Figure 15:
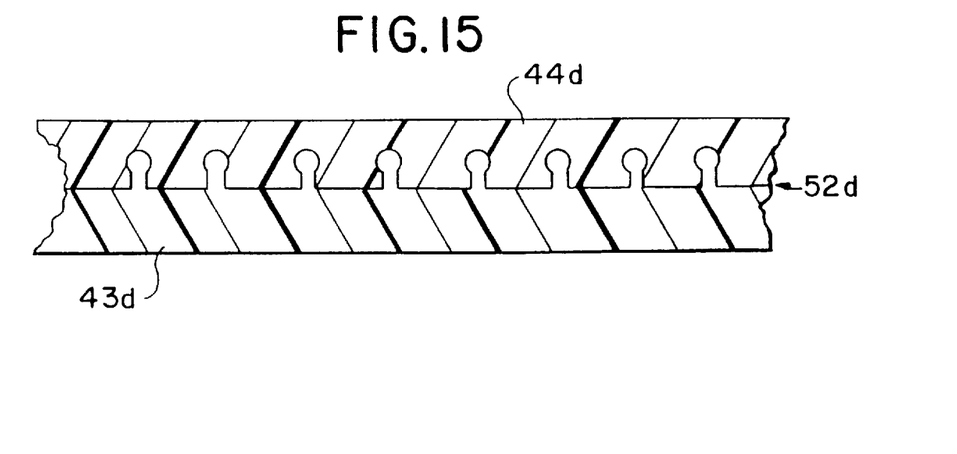
FIG. 15 is a cross-section of an alternative embodiment of the portion of a garment hanger that would be formed by still another alternate mold construction if taken along section line 13—13 in FIG. 16.
Figure 16:
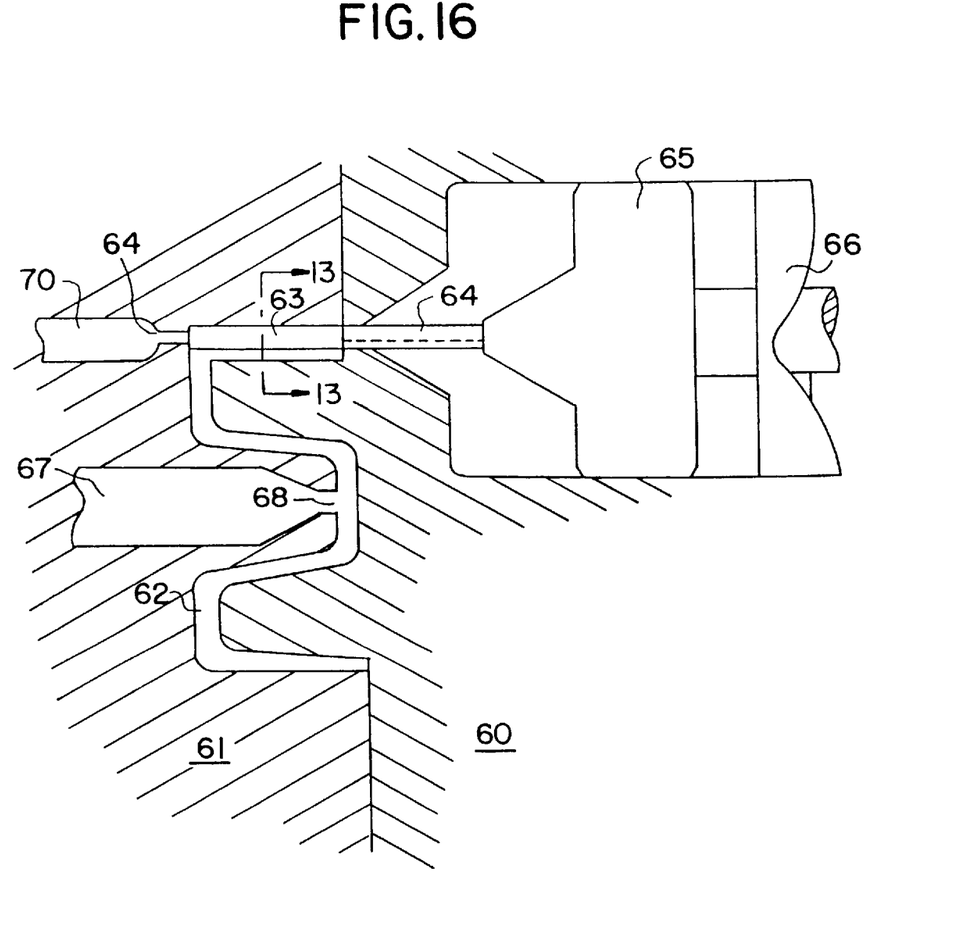
FIG. 16 is a cross-section of a mold cavity used to form the hanger illustrated in FIG. 8.

FIG. 13 is an enlarged illustration of a portion of the hangers illustrated in FIGS. 8–10 as formed in the mold cavity illustrated in FIG. 16. This cross-section is a portion of the cross-section taken at 90° to the cross-section illustrated in FIGS. 10 and 16 along section line 13—13. As illustrated in FIG. 13, the non-slip plastic insert 44 is mechanically bonded to the support arm 43b by means of a series of interlocking dove tail joints generally indicated at 52. An alternative embodiment for the means by which the non-slip plastic insert 44c is mechanically bonded to arm 43c is illustrated in FIG. 14 which illustrates a mechanical bond by means of a series of interlocking buttonhole joints, generally indicated at 52c in FIG. 14. Still another embodiment for the means by which the non-slip plastic insert 44d is mechanically bonded to arm 43d is illustrated in FIG. 15 which illustrates a mechanical bond by means of a series of interlocking key hole joints, generally indicated at 52d in FIG. 15. Any one of a variety of locking methods including those illustrated in FIGS. 13–15 can be used depending upon the preference of the manufacturer. Alternately, the configurations may be reversed with the key portion that is illustrated as integrally molded on arm 43b, c or d, molded on non-slip insert 44, and the complementary portion that is illustrated as integrally molded on non-slip plastic insert 44b, c or d is molded on arm 43b. The illustrations of FIGS. 13–15 are intended to be illustrative only of a wide variety of mechanical interlocks suitable for use as a mechanical bond.

Figure 17:
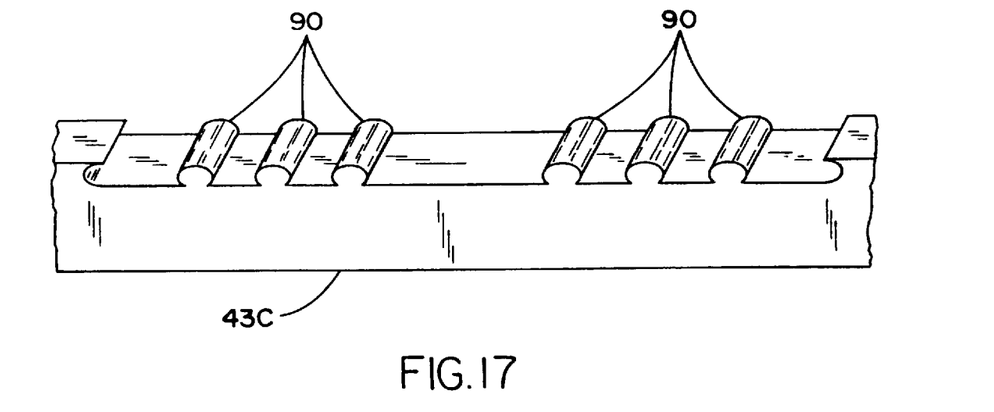
FIG. 17 is an enlarged fragmentary view of an alternative embodiment of FIG. 14 depicting locking members formed on the hanger body.

FIG. 17 is an illustration of locking members 90 formed in the hanger body by the first plastic material before the second plastic material is added. In the embodiment depicted in FIG. 17, the non-slip insert which is not shown would be mechanically bonded to the support arm 43c by a series of interlocking buttonhole joints. However, the means by which mechanical interlocking is accomplished is merely exemplary, other forms of mechanical bonding, including but not limited to, the series of interlocking dovetail joints and interlocking key hole joints depicted in FIGS. 13 and 15, respectively, are also contemplated.

Figure 18:
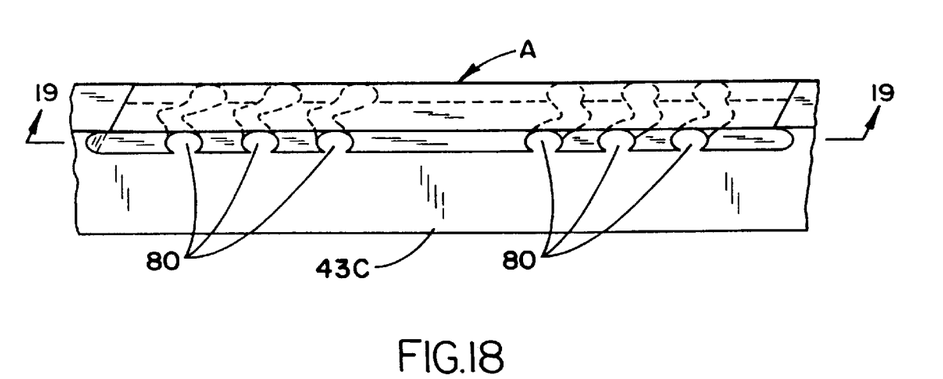
FIG. 18 is an isometric view of a garment hanger with the interlocking member of FIG. 17 and the plastic insert depicting the mechanical interlock with thermal deformation.

FIG. 18 is an illustration of a combination form of bonding using mechanical interlocking and controlled thermal deformation. The non-slip plastic insert 44 is mechanically bonded to the support arm 43c by a series of interlocking members 90.

Figure 19:
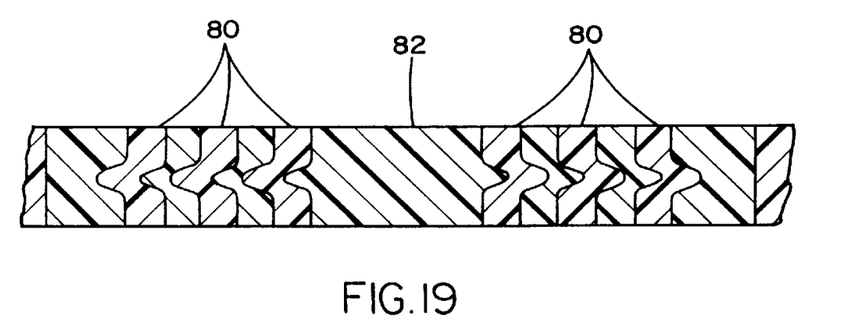
FIG. 19 is a sectional view taken along line 19—19 of FIG. 18.
Figure 20:
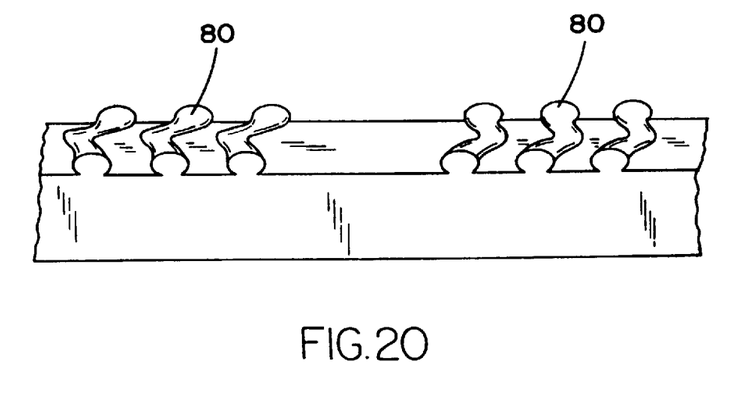
FIG. 20 is an enlarged partial fragmentary view of FIG. 18 depicting the thermal deformation of the locking members if the plastic insert shown in FIG. 18 is removed.

In this embodiment, the second plastic material melts and deforms the interlocking member thereby deforming the structure of the interlocking member to produce a ribbon of material 80. FIG. 18 specifically depicts one embodiment of the ribbon of material 80 when the second plastic material is injected at the center of the mold cavity forming the insert, from a point such as A. FIG. 19, which is a cross-section of FIG. 18 taken along line 19—19, depicts an exemplary positioning of the ribbons of material 80 formed from the interlocking members of the first plastic material with respect to the plastic insert 82 of the second plastic material due to controlled thermal distortion. In FIG. 20 a fragmentary view of the ribbons of material 80 with the insert material removed is shown.

The force of the second plastic material's flow outwardly, in this embodiment, to fill the cavity forming the insert, in combination with the hot temperature at which the second plastic material can be introduced, distorts, in this instance the center portions, of the interlocking members to produce the staggered ribbon-like effect shown in FIGS. 18–20. Combining mechanical interlocking with controlled thermal deformation imparts an enhanced degree of bonding to prevent the delamination or otherwise detachment of the inserts from the hanger body even under extreme conditions. As the locking ribbons 80 are deformed, they are detached from the base 43c, and begin to float freely in the hot thermal flow of the second plastic, thereby forming a complete interlock, with the second plastic completely surrounding the detached ribbons of the first material.

The ribbons remain anchored at their outer extremity to the base material 43c because the mold is continuously cooled, and the outer extremity remains below the melting point of the base plastic. The amount of thermal deformation can be controlled by the temperature and pressure of the incoming plastic and the cooling applied to the mold. The incoming injection pressure will determine the velocity of the wave front of the incoming plastic, and consequently the kinetic energy used in the deformation. By varying temperature and pressure, the relative amount of melting and distortion can be controlled to produce the desired degree of interlock. Satisfactory results can be obtained by melting the ribbon all the way through in the center, but in the preferred embodiment the ribbon remains in one piece, attached to the base of either end.

The mold for producing the construction is illustrated in FIG. 16 wherein injection mold 60, 61 define therebetween a mold cavity 62 with a sub-cavity 63 that is, during a first mold cycle, filled with a reciprocating core member 64. Core member 64 is mounted on reciprocating piston 65 for movement in and out of mold cavity 63 by virtue of a hydraulic or pneumatic cylinder 66.

A first plastic material in a molten state is injected through feeder 67 and orifice 68 to fill the mold cavity 62 during the first mold cycle. During this filling operation, mold core 64 is within and completely fills the mold cavity 63 and closes orifice 69. After the plastic from the primary source feeder 67 has completely filled the mold cavity 62, a second mold cycle is begun in which the mold core 64 is withdrawn from cavity 63 which allows a second insert plastic material to be injected via conduit 70 through orifice 69 and into mold cavity 63. So as to prevent wasted plastic material which is environmentally disadvantageous, in a preferred embodiment conduit 70 is a hot runner rather than a tunnel gate and conventional runner. The residence time of core 64 within cavity 63 is dependent upon the type of plastics being used, the operating temperatures, the cycle time, and the type of bond desired between the insert and the plastic hanger body. It should be noted that the mold core 64 has a dove tail cross-section essentially identical to the cross section illustrated in FIG. 13 for insert 44.

When mold core 64 is filling cavity 63 it forms the dove tail portion of the main hanger body 43b as illustrated in FIG. 13 from the primary material. When the core 64 is withdrawn, the secondary material fills each of the dove tail cavities formed in the base member thereby completing the cross-section illustrated in FIG. 13. However, it should be noted that the present invention is not limited to mechanical bonding by means of dove tail joints. As illustrated in FIGS. 14 and 15 the mold core 64 could also have a buttonhole joint or keyhole joint cross-section as means of mechanically bonding the arm 43b and the non-slip plastic insert 44. After the insert cavity 63 has been filled, mold 60, 61 is cooled, mold members 60, 61 are separated, and the newly formed hanger is ejected from mold cavity 62 by means of ejector pins (not shown).

From the foregoing illustrations it is readily apparent that the present invention is directed to an extremely simple composite garment hanger construction, preferably produced in a coinjection mold through a simple two step process which requires a minimum amount of effort and expenditure, while being versatile in its applications due to the specific structural aspects of the members. No costly hand labor is required to attach sizing index caps, to stamp logos, or to affix the non-slip strips to the shoulders of the hangers. All is accomplished in a single molding operation.

The plastic materials which can be employed with the molding operation in order to produce the inventive composite molded plastic hanger may include, but are not limited to, plastic materials such as polystyrene, SAN, ABS, PPO, nylon, polypropylene, polyethylene, PET, polycarbonates, acrylics, K resin, and PVC among others, each being provided with specific coloration in conformance with the specific demands of the customer. When it is desired to mold composite hangers with the non-slip inserts, polypropylene and polyethylene primary materials may be combined with ethylene vinyl acetate, low density polyethylene, or thermoplastic elastomers for the non-slip layer. Alternately, if polystyrene, ABS or SAN primary materials are desired, they may be combined with ethylene vinyl acetate, PVC, thermoplastic elastomers or thermoplastic rubbers. Other materials suitable for the primary body construction such as PVC, PC, PMMA or a mixture of a polystyrene with one of the foregoing primary materials may be used with EVA, PVC, thermoplastic elastomers or thermoplastic rubbers and the non-slip insert material.

In one preferred embodiment, styrene or polypropylene is used as the primary material with a softer material (such as a thermoplastic rubber including, but not limited to, Kraton) used for the insert. In another embodiment a harder material can used as the insert including, but not limited to, polyethylene with a propylene membrane.

More particularly, when a chemical bond is desired, it is preferable to use styrene main as the primary material with styrene or polypropylene main as the primary material with EVA/PP mix. When a chemical and mechanical bond is desired, it is preferable to use styrene main as the primary material with styrene rubber. When a mechanical bond is desired, it is preferable to use polypropylene main as the primary material with polyethylene.

In a particularly preferred embodiment of the present invention, a composite hanger of the present invention of a first plastic material, similar in style to the hanger depicted in FIG. 8, was molded with the non-slip plastic layer 45 of a second plastic material integrally molded with each of the arms of the hanger such that the non-slip layer forms the upper top portion of the shoulder of each of the hanger arms. A combination of mechanical interlocking and controlled thermal deformation bonds the first and second plastic materials. The mechanical bonding is accomplished by a series of interlocking buttonhole joints.

Commercially available equipment which has been specifically adapted was used to mold the composite hanger of the present invention. An adapted Nissei 150 ton injection molding machine was used to inject the primary material comprising the hanger body and an adapted injection cylinder from a Boy 10 injection molding machine was used to inject the secondary material comprising the non-slip layer.

The primary material used in this instance is a combination of Dow styrene grades 693 and 478. The secondary material is a D grade material available from Shell Oils which has a trade name of Kraton. The melt temperature of the Kraton is about 600° F., plus or minus 50° F. The size of the orifice is about 0.062 inches, however, this size will vary with the design of the hanger and the second material type.

While there have been shown and described what are considered to be the preferred embodiments of the invention, it will, of course, be understood that various modifications and changes in form or detail can readily be made without departing from the spirit of the invention. It is therefore intended that the invention not be limited to the exact form and detail herein shown and described nor to anything less than the whole of the invention herein disclosed as hereinafter claimed.

What is claimed is:

1. A method of molding a composite plastic garment hanger formed of first and second plastic materials, said method comprising:
   (a) advancing a retractable mold core into a mold for a plastic hanger, said retractable mold core defining a mechanical joint pattern for a portion of a composite hanger to be molded in said mold to create a first mold cavity which defines a first section of a mechanical joint pattern within said mold;
   (b) injecting a first plastic material into said first mold cavity to form a first portion of said composite plastic garment hanger and a first section of said mechanical joint pattern, and partially cooling said first material;
   (c) retracting said retractable mold core to define, in combination with the first plastic material, a second mold cavity which defines a second section of said mechanical joint pattern;
   (d) injecting a second plastic material into the second mold cavity to form a second portion of said composite plastic garment hanger and a second section of said mechanical joint pattern to form an interlocking mechanical joint pattern;
   (e) controlling the partial cooling of said first material in step (b) and the temperature and injection pressure of the injecting step set forth in step (d) to provide thermal deformation in a boundary zone between the first and second sections of said mechanical joint pattern,
   wherein said first plastic material forming the first section of the mechanical joint pattern is thermally deformed with said second section of said mechanical joint pattern to form said interlocking mechanical joint pattern with thermal deformation of both sections;
   (f) cooling said mold to solidify said first and said second plastic materials;
   (g) ejecting said composite plastic garment hanger from said mold.

2. The method of claim 1, further comprising bonding said first and second plastic materials by thermal distortion of said first section of said mechanical joint pattern to prevent delamination of said materials in said plastic hanger.

3. The method of molding a composite plastic hanger as claimed in claim 1, which further includes the step of molding complimentary indicia on each side of said second plastic portion by:
   (a) forming a first indicia on a mold face portion of said retractable mold core prior to step (a);
   (b) forming a second complimentary indicia on a face portion of said mold opposite the mold face portion defined by said retractable core so that after the advancing step (a), the first and second indicia cover each other and do not form part of the first mold cavity;
   (c) molding said first and second indicia in said second portion of said composite plastic hanger as said second plastic material is injected in step (d).

4. The method of molding a composite plastic hanger as claimed in claim 3, wherein size indicia are molded into each side of said composite hanger.

5. The method of molding a composite plastic hanger as claimed in claim 3, wherein said thermal distortion is minimized to provide a removable size indicator in said composite hanger.

6. The method of molding a composite plastic hanger as claimed in claim 1, which further includes the step of retracting said mold core before said first plastic material has hardened to enable a fused bond to be formed in the mechanical joint pattern between said first and second plastic materials.

7. The method of molding a composite plastic hanger as claimed in claim 1, which further includes the step of retracting said mold core after said first plastic material has partially hardened and injecting a non-slip plastic material in step (d) to form a mechanical bond between said first and second plastic materials.

8. The method of molding a composite plastic hanger as claimed in claim 7, which further includes the step of heating said non-slip second plastic material above a melt point of said first plastic material prior to injecting thereby forming a mechanical bond with thermal distortion.

9. A method for molding a composite plastic garment hanger consisting of at least first and second plastic materials so as to produce a composite garment hanger structure; said method comprising: injecting said first plastic material in a molten state into an injection mold so as to form a hanger of specified shape, said hanger having at least one aperture-forming enclosure molded thereon; partially cooling said hanger to a predetermined temperature within said mold to maintain the shape of an outer wall portion of said hanger; injecting said second plastic material at a controlled temperature and in a molten state into said mold so as to substantially fill said at least one enclosure and produce a bond with controlled thermal deformation of said first and second plastic materials; and cooling said first and second plastic materials to form said composite garment hanger structure.

10. The method as claimed in claim 9, wherein a movable core of said mold is alignable with an infeed for said second molten plastic material and said method includes the step of displacing said core from said infeed for said second molten plastic material to enable filling said enclosure in said hanger with said second plastic material.

11. The method as claimed in claim 9, wherein said is a garment hanger molded with first and second non-slip shoulder portions.

12. The method as claimed in claim 10, wherein said second plastic material forms an indicia for said garment hanger.

13. The method according to claim 10, wherein said controlled thermal deformation enables the formation of a bond which is a mechanical bond, a fused bond, a thermally deformed molded bond or a combination thereof.

14. The method according to claim 1, wherein said adjustable thermal deformation enables the formation of a bond between said first and second sections of said mechanical joint, said bond being formed along the mechanical joint pattern as a mechanical bond, a fused bond, or a thermally deformed molded bond or a combination thereof.

15. A method of molding a composite plastic garment hanger formed of first and second plastic materials, said method comprising:
   (a) advancing a retractable mold core for a plastic hanger, said retractable mold core defining a mechanical joint pattern for a portion of a composite hanger to be molded in said mold to create a first mold cavity which defines a first section of a mechanical joint pattern within said mold;
   (b) injecting a first plastic material into said first mold cavity to form a first portion of said composite plastic garment hanger and a first section of said mechanical joint pattern, and partially cooling said first plastic material;
   (c) retracting said retractable mold core to define, in combination with the first plastic material, a second mold cavity which defines a second section of said mechanical joint pattern;
   (d) injecting a second plastic material into the second mold cavity to form a second portion of said composite plastic garment hanger and a second section of said mechanical joint pattern to form an interlocking mechanical joint pattern with said first section of mechanical joint pattern, said injecting of said second plastic material being under conditions of temperature and pressure effective, with said partial cooling of said first plastic material, to provide bonding between said first and second sections of said mechanical joint pattern sufficient to prevent substantial delamination of said first plastic material and said second plastic material in said composite hanger;
   (e) cooling said mold to solidify said first and second plastic material; and
   (f) ejecting said composite plastic garment hanger from said mold.

16. The method of claim 15, wherein said bonding of said first and second plastic materials includes thermal distortion of said first section of said mechanical joint pattern.

17. The method of claim 16, wherein during the step of injecting the second plastic material into the second mold cavity, the first plastic material forming the first section of the mechanical joint pattern is thermally deformed such that said second plastic material forms an interlocking second section of the said mechanical joint pattern with thermal deformation of both sections.

18. The method of molding a composite plastic hanger as claimed in claim 17, wherein said second plastic material is a non-slip plastic material and said method further includes the step of heating said non-slip second plastic material above a melt point of said first plastic material prior to injecting, to thereby thermally distort said mechanical joint pattern.

19. The method as claimed in claim 15, wherein said second plastic material is a non-slip plastic material and said garment hanger is molded with first and second non-slip shoulder portions.

20. The method according to claim 15, wherein said bonding includes a controlled thermal deformation of said mechanical joint pattern which enables the formation of a bond which includes a mechanical bond, a fused bond, a thermally deformed molded bond or a combination thereof.

21. A method of molding a composite plastic garment hanger formed of first and second plastic materials, said method comprising:
   (a) advancing a retractable mold core into a mold for a plastic hanger, said retractable mold core defining a mechanical joint pattern for a portion of a composite hanger to be molded in said mold to create a first mold cavity which defines a first section of a mechanical joint pattern within said mold;
   (b) injecting a first plastic material into said first mold cavity to form a first portion of said composite plastic garment hanger and a first section of said mechanical joint pattern, and partially cooling said first material;
   (c) retracting said retractable mold core to define, in combination with the first plastic material, a second mold cavity which defines a second section of said mechanical joint pattern;
   (d) injecting a second plastic material into the second mold cavity to form a second portion of said composite plastic garment hanger and a second section of said mechanical joint pattern to form an interlocking mechanical joint pattern;
   (e) controlling the partial cooling of said first material in step (b) and the temperature and injection pressure of the injecting step set forth in step (d) to provide thermal deformation in a boundary zone between the first and second sections of said mechanical joint pattern, wherein said mechanical joint pattern is formed upon the thermal deformation of an interlocking member in the shape of dovetail joints or keyhole joints to form locking ribbons of material;
   (f) cooling said mold to solidify said first and said second plastic materials;
   (g) ejecting said composite plastic garment hanger from said mold.

* * * * *

UNITED STATES PATENT AND TRADEMARK OFFICE
CERTIFICATE OF CORRECTION

PATENT NO.    : 5,814,252
DATED         : September 29, 1998
INVENTOR(S)   : Stanley Gouldson et al.

It is certified that error appears in the above-identified patent and that said Letters Patent is hereby corrected as shown below:

Column 1,
Line 15, "connected" should read -- coinjected --

Signed and Sealed this

Thirty-first Day of December, 2002

JAMES E. ROGAN
*Director of the United States Patent and Trademark Office*